No. 872,096. PATENTED NOV. 26, 1907.
L. E. TREFFIÈRE & V. J. JEHIN.
MEANS FOR PREVENTING SIDE SLIP IN PNEUMATIC TIRES.
APPLICATION FILED MAR. 9, 1906.

Witnesses:
C. A. Crawford
H. M. Renson

Inventors:
Victor Joseph Jehin
Louis Eugene Treffière
by B. Singer Attorney

UNITED STATES PATENT OFFICE.

LOUIS EUGÈNE TREFFIÈRE AND VICTOR JOSEPH JEHIN, OF PARIS, FRANCE.

MEANS FOR PREVENTING SIDE SLIP IN PNEUMATIC TIRES.

No. 872,096.　　　　　Specification of Letters Patent.　　　　Patented Nov. 26, 1907.

Application filed March 9, 1906. Serial No. 305,189.

*To all whom it may concern:*

Be it known that we, LOUIS EUGÈNE TREFFIÈRE and VICTOR JOSEPH JEHIN, citizens of the Republic of France, residing at Paris, France, have invented new and useful Improvements in Means for Preventing Side Slip in Pneumatic Tires, of which the following is a specification.

This invention relates to a device or means adapted for use with the pneumatic tires of automobile vehicles founded on the principle of ice skates and adapted to prevent side slip of the wheels on the ground or even on ice.

The annexed drawing, shows as an example only a form of construction of the invention.

Figure 1:
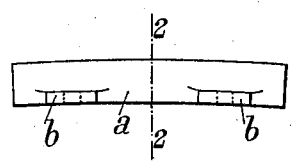
Figure 2:
Figure 3:
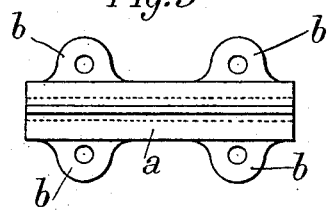
Figure 4:
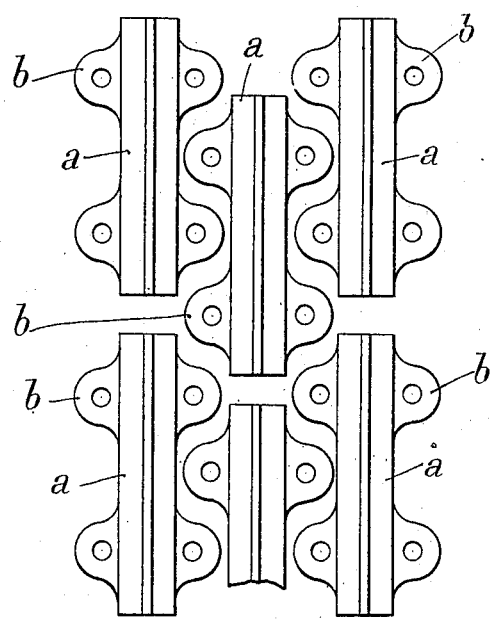

Figure 1 is an elevation of the improved device. Fig. 2 is a cross-section thereof on the line 2—2 of Fig. 1. Fig. 3 is a plan view of Fig. 1. Fig. 4 illustrates the manner in which the improved devices are applied to a pneumatic tire.

The invention comprises in combination with any tire or outer cover attached to the wheel, in any convenient manner, the projecting anti-slipping "skates" or plates $a$ which may be of triangular, knife-edge section, and preferably of steel, arranged alternately or staggered on said tire or cover or on a band secured to same. The said parts $a$ are arranged in the direction of revolution of the wheel for opposing by their longest dimension any lateral displacement or side slip of the wheel, their outer edge being for the purpose of cutting the ridges of mud interposed between the tire and ground and which are the greatest causes of side slip.

The parts $a$ may be provided with lateral lugs $b$ by which they may be secured to the cover or band in any suitable manner, for instance by means of rivets.

The anti-slipping parts or "skates" minimize wear and tear of the tire, while preserving its resiliency and protecting it from puncture and at the same time considerably reduce the adhesion to the ground, the wheels revolving on the edges of the parts $a$. These plates or "skates" $a$ are preferably attached to the cover or band in three or more endless parallel rings.

Having now particularly described and ascertained the nature of our said invention and in what manner the same is to be performed, we declare that what we claim is:—

In a device of the class described the combination of a plurality of strips secured to the tire tread, said strips being located upon the tire in a plane co-incident with the plane of rotation thereof and in alined rows, the strips of each row being spaced apart longitudinally at their ends and disposed upon the tread in staggered relation to bring said spaces between the ends of the strips of one row out of transverse alinement with the spaces of strips of adjacent rows, said strips being provided with laterally projecting attaching ears formed to provide intervening recesses, the attaching ears of one strip projecting into said intervening recesses of the strips of adjacent rows.

In testimony whereof we have affixed our names to this specification in the presence of two subscribing witnesses.

LOUIS EUGÈNE TREFFIÈRE.
　　　　VICTOR JOSEPH JEHIN.

Witnesses:
　HENRI VIGNAUS,
　JULOI CAVERM.